United States Patent [19]

Van Pelt et al.

[11] Patent Number: 4,459,144
[45] Date of Patent: Jul. 10, 1984

[54] MULTI-STAGE COUNTER-CURRENT CONCENTRATION SYSTEM AND METHOD

[75] Inventors: Willem Van Pelt; Jacques P. Roodenrijs, both of 's-Hertogenbosch, Netherlands

[73] Assignee: Grasso's Koniklijke Machine Fabrieken, N.V., 's-Hertogenbosch, Netherlands

[21] Appl. No.: 349,819

[22] Filed: Feb. 18, 1982

Related U.S. Application Data

[63] Continuation of Ser. No. 202,429, Oct. 30, 1980, Pat. No. 4,316,368.

[51] Int. Cl.³ ............................................. B01D 9/04
[52] U.S. Cl. ........................................ 62/541; 62/542; 62/545; 62/123
[58] Field of Search .................. 62/541, 542, 544, 532, 62/123, 545, 543

[56] References Cited

U.S. PATENT DOCUMENTS 3,561,225 2/1971 Hinton .................................. 62/542

Primary Examiner—Frank Sever
Attorney, Agent, or Firm—Cushman, Darby & Cushman

[57] ABSTRACT

A system and method for concentrating aqueous beverages such as fruit juices, beer, wine, vinegar, tea, coffee, and the like in which a slurry of feed liquid and seed crystals is formed in a scraped surface heat exchanger of a first stage and supplied to a recrystallizer where larger crystals grow, the liquid in the recrystallizer being withdrawn with part recirculated to the heat exchanger of a succeeding stage. The slurry of larger crystals in the recrystallizer of the first stage is also withdrawn and the crystals separated in a wash column. The larger crystals grown in the second stage recrystallizer are supplied to the recrystallizer of the first stage where the seed crystals melt and reform on the larger crystals and the larger crystals from the third stage are similarly supplied to the recrystallizer of the second stage.

1 Claim, 8 Drawing Figures

MULTI-STAGE COUNTER-CURRENT CONCENTRATION SYSTEM AND METHOD

This is a continuation, of application Ser. No. 202,429 filed Oct. 30, 1980, now U.S. Pat. No. 4,316,368.

BACKGROUND AND SUMMARY OF THE INVENTION:

The invention relates to a system and method for concentrating an aqueous beverage.

Concentrating aqueous beverages for storage, transportation and sale has a number of substantial advantages and is being used more and more widely for an increasing variety of beverages. For some products, for example, coffee and tea, the purpose of concentration is to produce a product which is convenient for the consumer to use. For other products such as wine, milk, beer, vinegar and the like, the greatest advantage may lie in reducing the bulk of the material and thus reducing the expense of storage and transportation.

Concentration of such aqueous beverages can be done in one of three ways—evaporation, freeze concentration, or reverse osmosis. In evaporation techniques the beverage is heated or steam is passed therethrough to remove the water by evaporation. In freeze concentration techniques, a slurry of ice is formed in the beverage and the ice then separated from the resulting concentrated liquor. One of the drawbacks to evaporation techniques is that many of the subtle flavor components of aqueous beverages are volatile and escape during evaporation. This difficulty can in part be overcome by stripping many of those components before evaporation and then returning them to the concentrated beverage. However, some degradation in flavor seems to be inevitable with evaporation techniques. Reverse osmosis is non-selective and flavor components are lost making it unsatisfactory for concentration of aqueous beverages.

Freeze concentrated products do not suffer from degradation since retention of flavor components is almost one hundred percent. The main drawbacks in the past to freeze concentration processes have been expense and insufficient volume of operation.

The present invention relates to a process and system for freeze concentration which is more efficient than previous techniques and which can process large volumes of concentrated aqueous beverages in relatively short times.

The U.S. Pat. No. 4,004,886 to Thijssen et al. describes a process and apparatus for crystallization in which a slurry of seed ice crystals and mother liquor are produced in a scraped surface heat exchanger and continuously supplied to a recrystallization vessel in which the crystals grow. The mother liquor in the recrystallizer vessel is continuously mixed and recirculated to the scraped surface heat exchanger via a filter which prevents crystals from leaving the recrystallizer. Almost all of the crystals in the recrystallizer melt and reform on a few small seed crystals to produce a crystal slurry having relatively uniform sized crystals therein, which slurry is removed continuously from the recrystallizer as a crystal suspension. In this arrangement, the residence time in the system is substantially reduced because of the melting of the seed crystals supplied to the recrystallizer from the heat exchanger and reformation of these melted crystals onto the few large crystals which then grow as spheres. While others in the past have proposed systems using both scraped surface heat exchangers and larger tanks in which crystal growth takes place, for example, the U.S. Pat. No. 3,156,571, to Walker it is the melting of the vast majority of the ice crystals and the recirculation only of liquid from the recrystallizer which reduces the residence time and produces the uniform crystal size in both the system described in the Thijssen et al. patent, and the present invention. The uniform crystal size in particular permits use of wash columns in the system instead of centrifuge or other separating devices which have technical and other disadvantages.

The slurry which is removed from the recrystallizer in the above-described system of the Thijssen et al. patent is preferably supplied to a wash column, for example, as described in the Thijssen U.S. Pat. No. 3,872,009. In this particular wash column, the slurry is supplied to the bottom of a column and then compacted against the ice mass by a piston which periodically pushes the mass upward. The ice at the top of the column is chopped and removed from the column where it is melted and at least in part returned to the column to flow downward when the piston applies pressure to the bottom of the column to maintain a wash front. The mother liquor is removed as concentrated liquor through perforations in the piston.

In the system of the present invention, a plurality of concentrating units are connected together for countercurrent operation. Countercurrent freeze concentration as such is not new. For example, Ganiaris U.S. Pat. No. 3,283,522 describes a multi-stage freeze concentrating system in which ice passes toward the first stage and mother liquor toward the last stage. However, in the present invention, only the crystals from the succeeding stage grow; in all stages except the last, practically all seed crystals (of the order of 99% and at least more than 90%) formed in that stage melt and reform on the larger crystals from the succeeding stages and this remarkably improves the efficiency of concentration. Further, the separation is done in the lowest concentration step where viscosity is lowest and the wash column performs most efficiently.

In the first stage of the present invention which receives the feed liquid to be concentrated and produces a first intermediate concentrated solution, a slurry of ice crystals and liquid in a recrystallization vessel are supplied to a separator such as a wash column and the intermediate concentrated solution is passed to a second stage. The ice crystals from the second stage are passed countercurrent to the direction of movement of the aqueous beverage liquid and supplied to the recrystallization vessel of the first stage. Almost all of the seed crystals produced in the first stage, for example, by a scraped surface heat exchanger, then melt and reform upon the larger crystals supplied from the second stage. Third and additional stages can also be provided, each passing at least the ice break directly to the recrystallization vessel of the preceding stage so that the crystalline growth takes place only on the crystals which are supplied from the succeeding stage and practically all of the crystals generated in each stage except the last melt and reform thereon.

By utilizing this countercurrent approach, three stages which each can remove 250 kilograms of ice per hour from a liquid feed will remove at least 1800 kilograms per hour in a countercurrent configuration, as opposed to 750 kilograms per hour in parallel operation and 1200 kilograms per hour in serial operation in which only the liquid is passed through succeeding stages.

The water removal capacity in kilograms of ice per hour of any freeze concentration system depends on the viscosity of a given product concentration and the diameter of the ice crystals at that concentration. The viscosity of any liquid is strongly dependent upon its concentration. The crystal growth velocity is dependent also upon concentration so that an increase in concentration results in a sharp decrease of the crystal growth velocity and an increase in viscosity, both of which substantially reduce the rate of crystal growth. Using the countercurrent approach, crystal growth can take place on crystals which have already grown large and can take place in a less concentrated solution, both factors decreasing residence time and hence increasing capacity. Separation in the lowest concentration stage is also most efficient.

Other purposes and objects of the invention will be clear from the following detailed description of the drawings.

Figure 1:
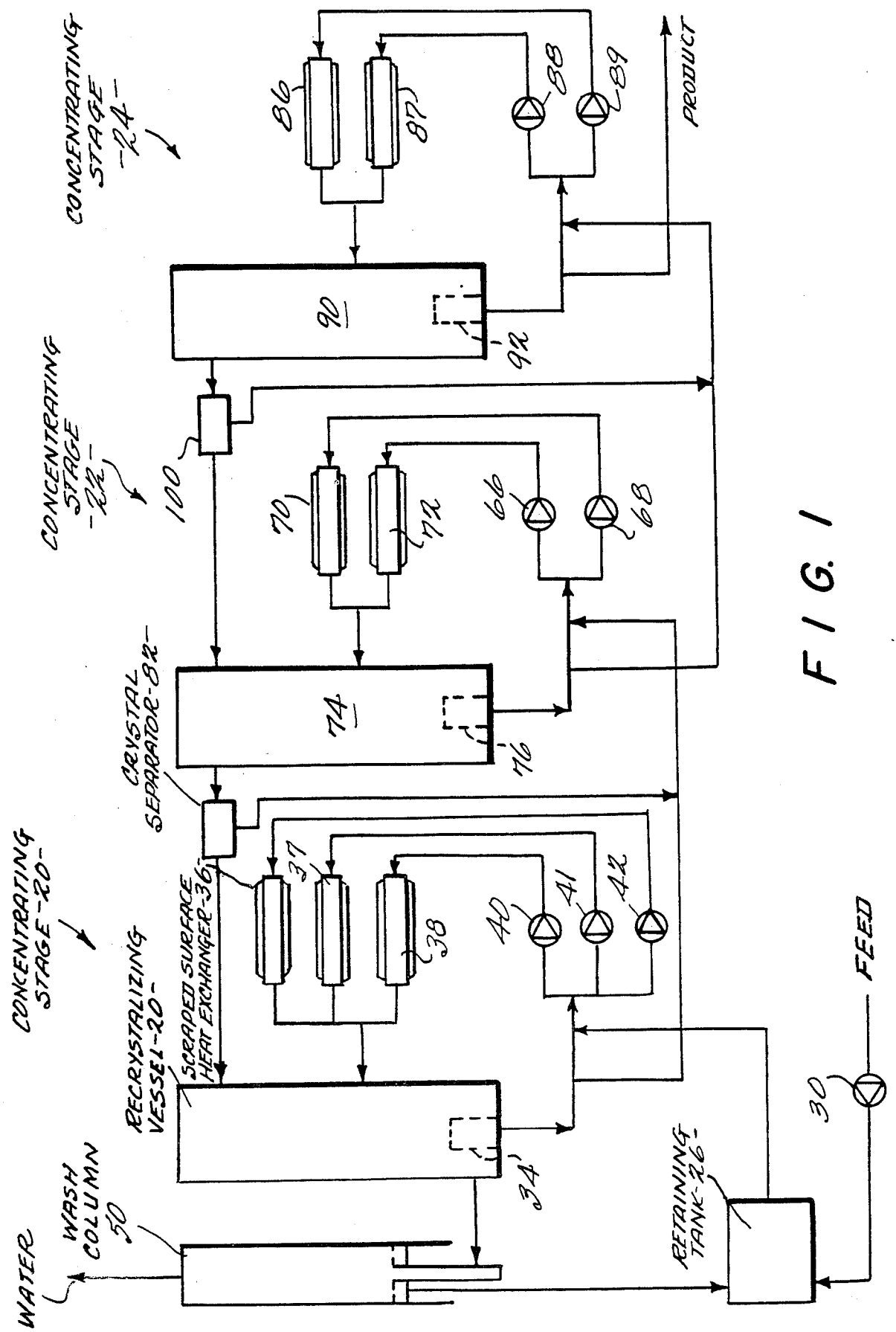
FIG. 1 shows a schematic diagram of a first embodiment of the counter-current system of the present invention.

DETAILED DESCRIPTION OF THE DRAWINGS:

Reference is now made to FIG. 1 which illustrates in schematic form a counter-current crystallization plant comprising three concentrating stages generally indicated as 20, 22 and 24. It will be understood that the present invention can be utilized with as few as two stages and as many as are necessary and appropriate to achieve desired concentration. An aqueous beverage liquid to be concentrated is supplied to a retaining tank 26 of stage 20 continuously or periodically. Feed liquid to tank 26 is supplied by pump 30. A portion of the liquid in recrystallizing vessel 32 is removed via filter 34 as described in the above-mentioned Thijssen U.S. Pat. No. 4,004,886, the disclosure of which is hereby incorporated by reference. A part of the liquid removed from vessel 32 as a first intermediate concentrated liquid and the feed liquor from tank 26 are mixed and supplied to three parallel connected conventional scraped surface heat exchangers 36, 37 and 38 by pumps 40, 41 and 42. It is preferred to use two or three scraped surface heat exchangers in parallel in each stage rather than a large one so that if one should malfunction, the system can still continue in operation. As described in the above-mentioned Thijssen U.S. Pat. No. 4,044,886, the slurry of seed crystals and liquid formed as output of the scraped surface heat exchangers is supplied to vessel 32. These seed crystals preferably have an effective diameter less than 5-10 microns. The seed crystals practically all melt within vessel 32 and reform on larger crystals from the succeeding stage supplied as described below. The slurry or larger ice crystals and liquid in vessel 32 is removed therefrom and the ice separated from the mother liquor in wash column 50 as described in the above-mentioned U.S. Pat. No. 3,872,009 to Thijssen, the disclosure of which is also hereby incorporated by reference. The melted ice is removed by wash column 50 from the system as water and discarded. The concentrated output of wash column 50 is supplied to feed tank 26 and hence to the scraped surface heat exchangers as described above.

A portion of the liquid in recrystallizing vessel 74 is removed via filter 76 as described in the above mentioned Thijssen patent 4,004,886, the disclosure of which is hereby incorporated by reference. A part of the liquid removed from vessel 74 as a second intermediate concentrated liquid and the other part of the first intermediate concentrated liquid removed from vessel 32 via filter 34 is mixed and supplied to two parallel connected conventional scraped surface heat exchangers 70 and 72 by pumps 66 and 68. It is preferred to use two scraped surface heat exchangers in parallel in each stage rather than a large one, so that if one should malfunction, the system can still continue in operation. As described in the above mentioned Thijssen U.S. Pat. No. 4,044,886 the slurry of seed crystals and liquid formed as output of the scraped surface heat exchangers is supplied to vessel 74. These seed crystals preferably have an effective diameter less than 5-10 microns. The seed crystals practically all melt within vessel 74 and reform on larger crystals from the succeeding stage supplied as described below. The slurry of ice crystals and liquid in recrystallizer 74 is removed therefrom and the liquid partially separated by a separator 82 and preferably mixed with the intermediate concentrated liquid from stage 20. The remainder of the liquid with ice crystals is fed to recrystallization vessel 32 where the relatively large ice crystals (compared to the crystals supplied by heat exchangers 36, 37 and 38) grow as the seed crystals from heat exchangers 36, 37 and 38 melt and reform on the larger crystals from stage 22.

A portion of the liquid in recrystallizing vessel 90 is removed via filter 92 as described in the above mentioned Thijssen U.S. Pat. No. 4,004,886, the disclosure of which is hereby incorporated by reference. A part of the liquid removed from vessel 90 as a final concentrated liquid and the other part of the second intermediate concentrated liquid removed from vessel 74 via filter 76 is mixed and supplied to two parallel connected conventional scraped surface heat exchangers 86 and 87 by pumps 88 and 89.

It is preferred to use two scraped surface heat exchangers in parallel in each stage rather than a large one, so that if one should malfunction, the system can still continue in operation. As described in the above mentioned Thijssen patent 4,044,886 the slurry of seed crystals and liquid formed as output of the scraped surface heat exchangers is supplied to vessel 90. These seed crystals preferably have an effective diameter less than 5-10 microns. Most of the seed crystals supplied by heat exchangers 86 and 87 melt in recrystallizing vessel 90 and reform on those few crystals which do not melt. The slurry of ice crystals and liquid in recrystallizer vessel 90 is removed therefrom and the liquid partially separated by a separator 100 and preferably mixed with the intermediate concentrated liquid from stage 22. The remainder of the liquid with ice crytals is fed to recrystallization vessel 74 where the relatively large ice crystals (compared to the crystals supplied by heat exchangers 70 and 72) grow as the seed crystals from heat exchangers 70 and 72 melt and reform on the larger crystals from stage 24. The other part of the final concentrated liquid removed from vessel 90 is removed from the system as product.

Figure 2:
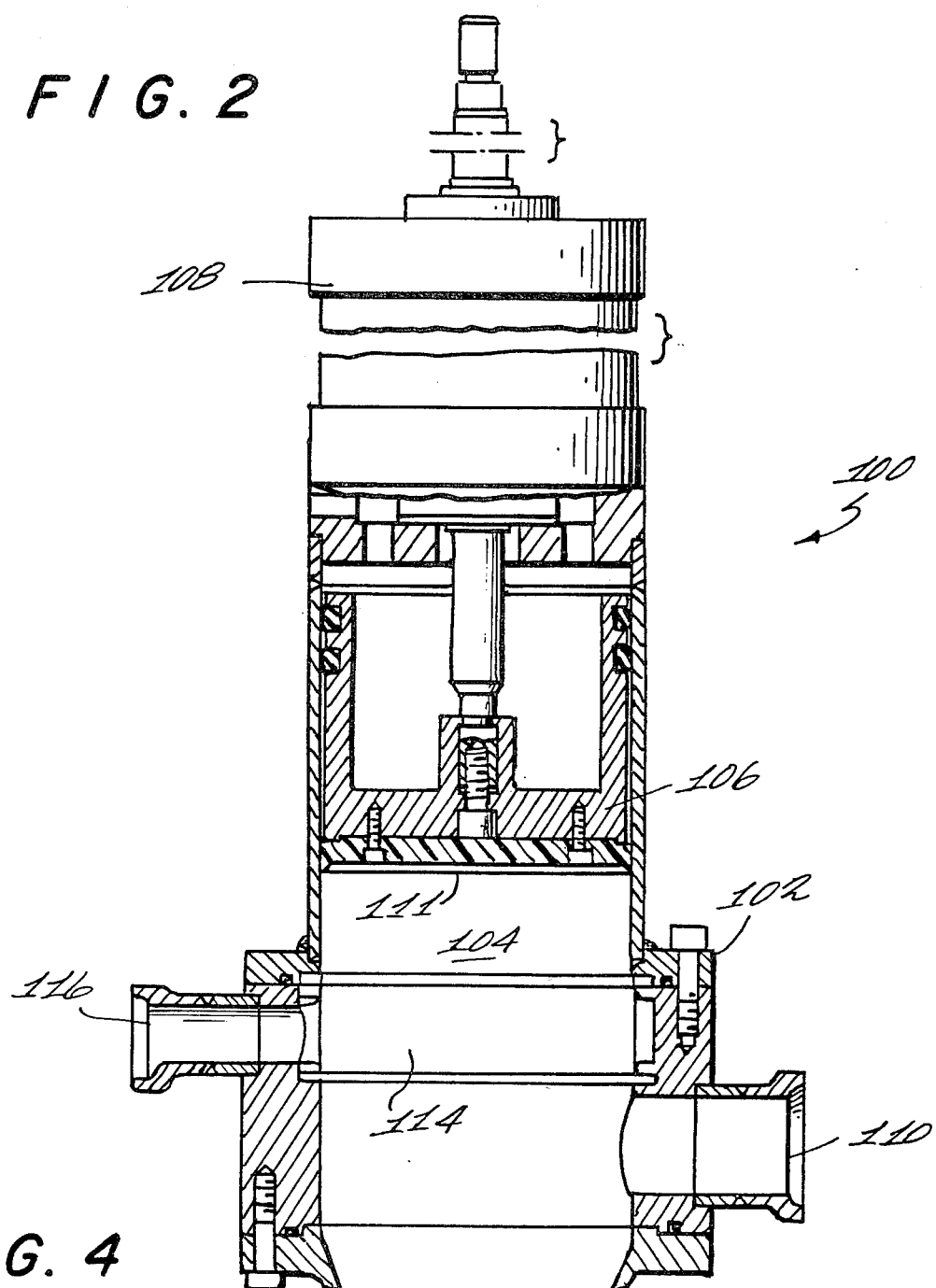
FIG. 2 shows a sectional view of a first separator according to the first embodiment.

Reference is now made to FIG. 2 which shows a separator 100 for use in the first embodiment diagrammatically illustrated in FIG. 1. Separator 82 preferably is identical to separator 100. Separator 100 includes a vessel 102 having an interior space 104 in which a piston 106 is reciprocated by conventional air cylinder 108. When the piston is withdrawn, the slurry enters space 104 via inlet 110. Air cylinder 108 is then operated to advance piston 106 and its cylindrical plastic face plate 111 toward outlet 112, compacting the ice slurry. The liquid mixed with the slurry is forced through filter 114 and outlet 116, and returned to the stage from which it was withdrawn. After a suitable amount of liquid has been withdrawn leaving the slurry still liquid enough to move through outlet 112, a valve associated with outlet 112 is operated to cause the slurry to be passed to the preceding stage as generally described above. Piston 106 advances to a position slightly beyond filter 114, to scrape filter 114.

Figure 3:
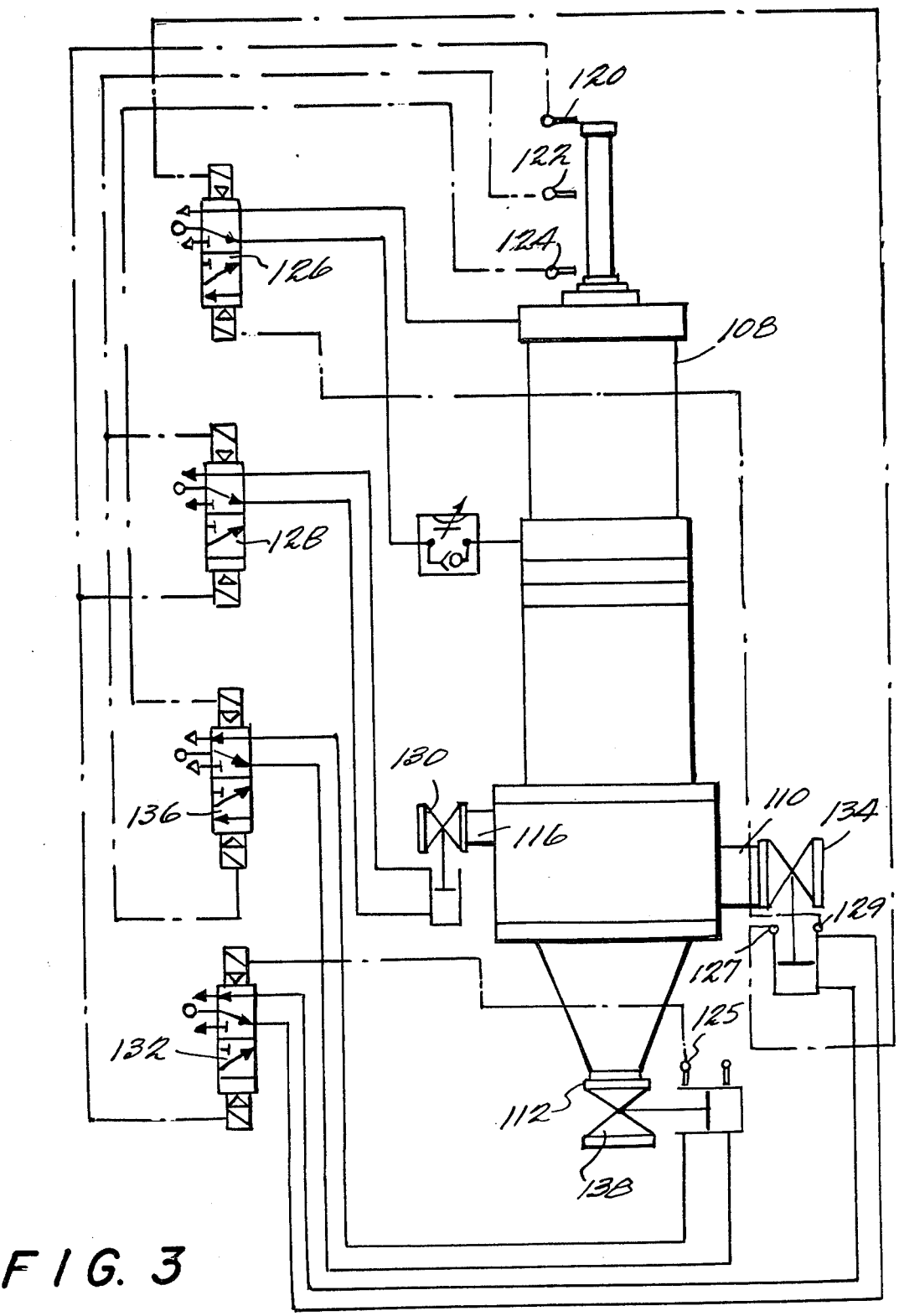
FIG. 3 shows a schematic view of the pneumatic control system for operating the separator of FIG. 2.

FIG. 3 shows the control circuit for operating pneumatic air cylinder 106. Three microswitches 120, 122 and 124 are successively operated as the cylinder 106 advances toward outlet 112. As piston 106 is withdrawn, valve 134 is open so that slurry is drawn into space 104. When switch 120 is operated logic 132 closes valve 134, operating switch 129. Operation of switch 129 operates logic 126 to reverse the direction of movement of piston 106 which now advances to squeeze liquid from the slurry in space 104. When switch 122 is operated, logic 128 closes valve 130 and logic 136 opens valve 138 so that the slurry is now pushed out outlet 112. Operation of switch 124 causes logic 136 to close valve 138 and operate switch 125. Operation of switch 125 causes logic 132 to open valve 134 in turn operating switch 127. Operation of switch 127 operates logic 126 to withdraw piston 106. The position of switch 122 determines the amount of liquid squeezed from the compacting ice mass.

Figure 4:
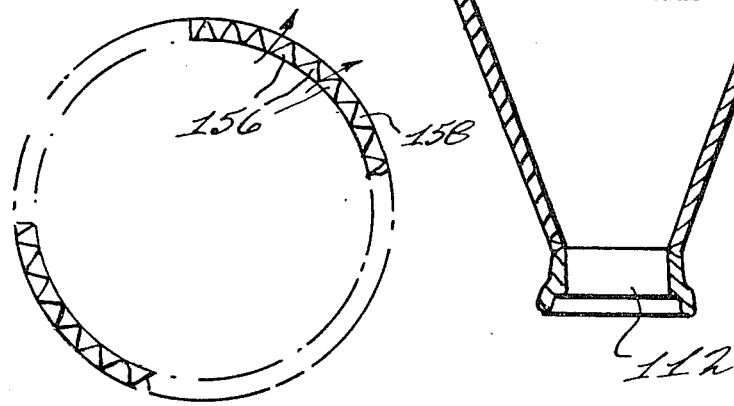
FIG. 4 shows a front view of the filter from the separator of FIG. 2.

FIG. 4 shows a view of the cylindrical filter which finds particular use in a separator as in this embodiment, and in the embodiments which follow. Such filters are well known in the art and used for a variety of purposes. A plurality of triangular shaped wires 156 are each fixed by welding or otherwise at the point of the triangle to a plurality of encircling bands 158. Wires 156 thus form slots through which the liquid can move but from which the ice is excluded. As piston face 111 moves past filter 114, the surface of filter 114 is scraped by face 111 to remove ice which has been drawn to and adhered to filter 114.

Figure 5:
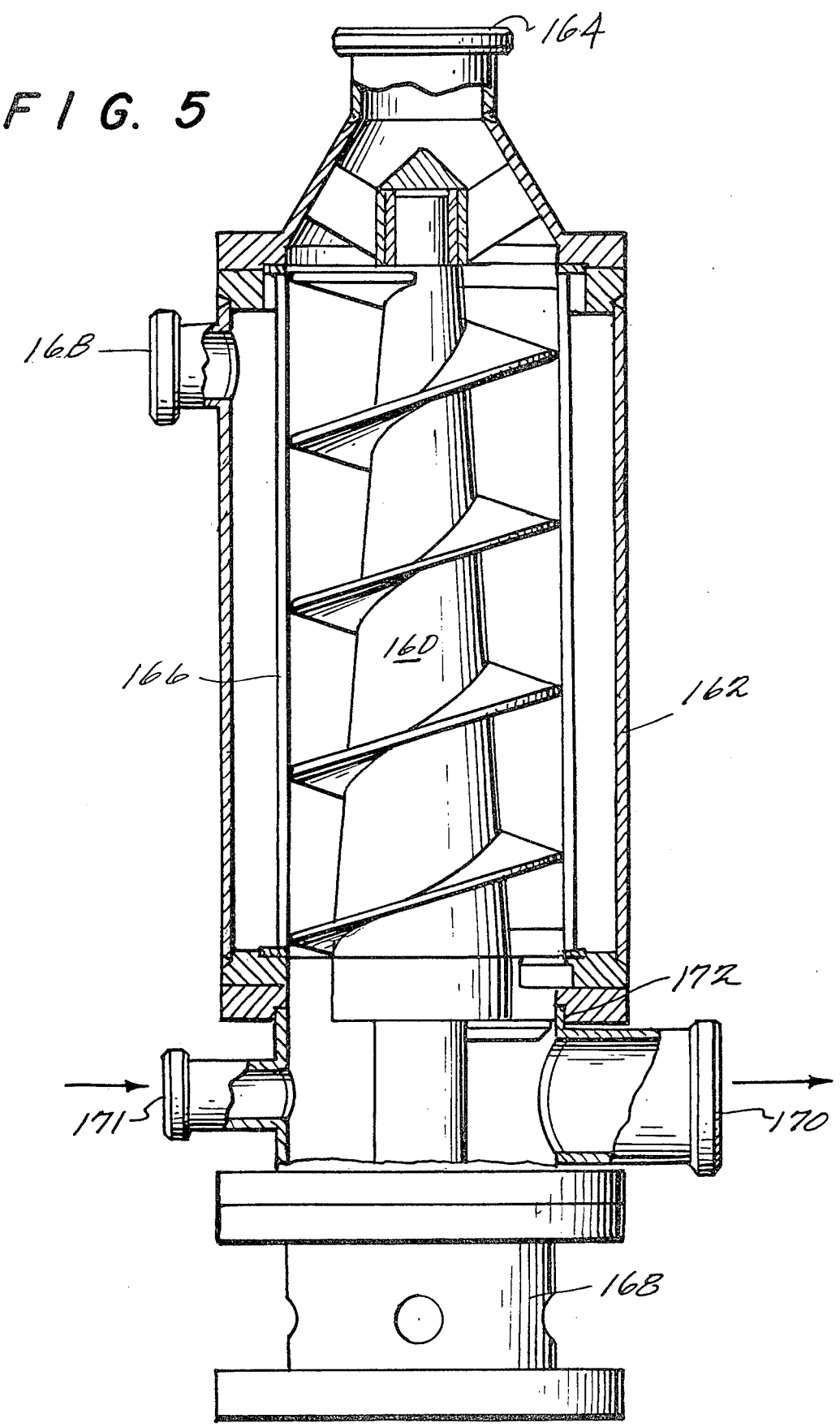
FIG. 5 shows a sectional view of a second separator according to the first embodiment.

FIG. 5 shows a second embodiment of a separator suitable for use with the system of FIG. 1. In this arrangement, a conically shaped converging screw 160 is used to compact the slurry which enters vessel 162 at inlet 164. Screw conveyor 160 is rotated continually by a motor (not shown) with the speed of rotation determining the output of the separator. In contrast to the arrangement of FIGS. 2-4, this embodiment operates continuously so that the output does not periodically increase nor decrease. Filter 166 through which the liquid is forced by the conically converging screw 160 is also formed as shown in FIG. 4. The liquid forced through filter 166 leaves through outlet 168, while the ice slurry leaves through outlet 170. Liquid entering through inlet 171 from the stage to which the ice is to be passed and scraper 172 slurries the ice which has been compacted and makes its movement to the next stage easier.

Another possible separator which can be used is a wash column with the top flushed with lower concentrate rather than wash water.

Figure 6:
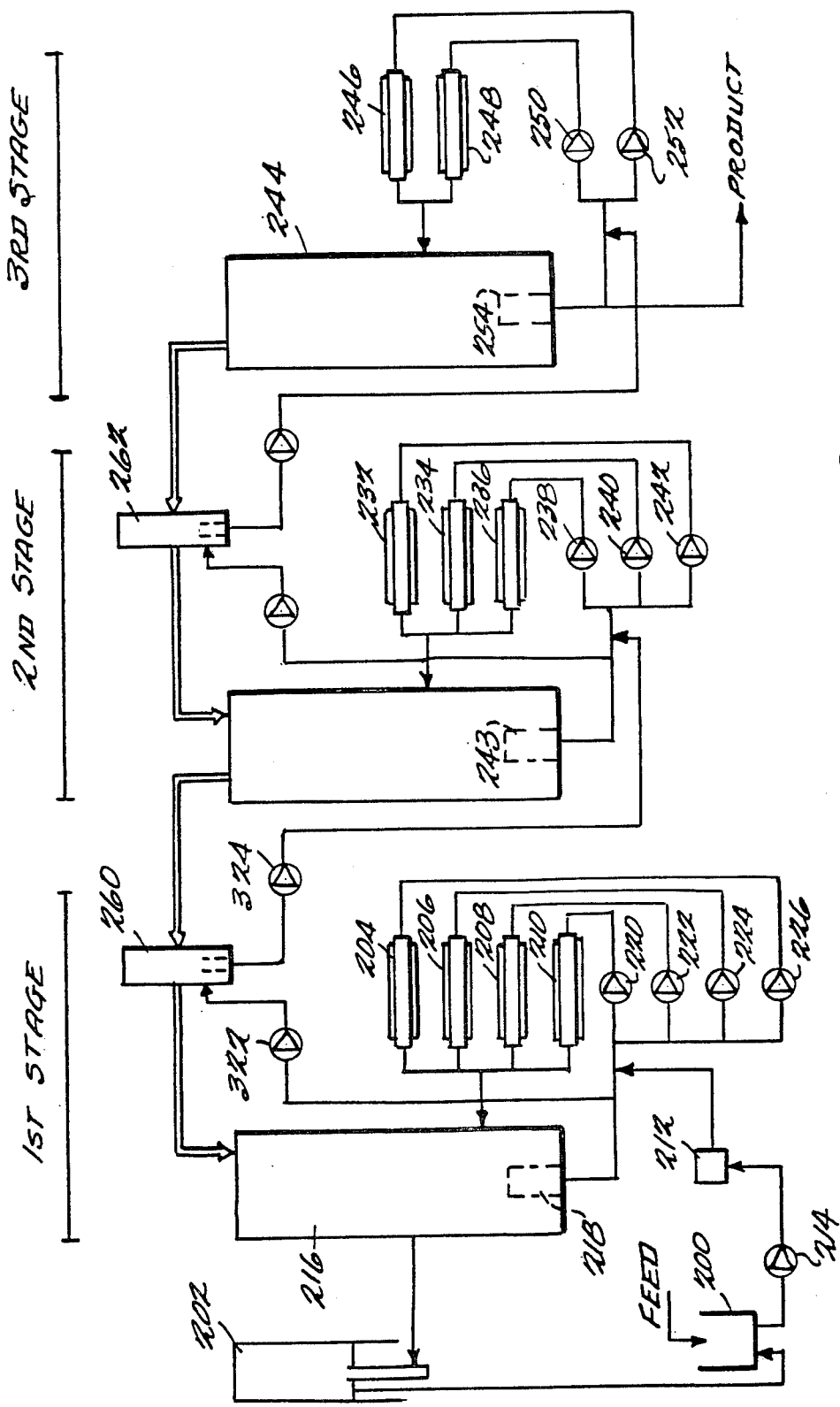
FIG. 6 shows a schematic diagram of a second embodiment of the counter-current system of the present invention.

Reference is now made to FIG. 6 which illustrates a further embodiment of the counter-current system of the present invention. As in the previous embodiment, a feed to be concentrated is supplied to a tank 200 where it is mixed with liquid from a wash column 202 and supplied to a plurality of scraped surface heat exchangesr 204, 206, 208 and 210 via tank 212. Pump 214 moves the liquid in tank 200 into intermediate tank 212. The scraped heat exchangers supply their output to recrystallizing vessel 216, and the liquid removed therefrom via filter 218 is partially recirculated by pumps 220, 222, 224 and 226 and partially supplied as an intermediate concentrated liquid to a second stage including recrystallizing vessel 230, heat exchangers 232, 234 and 236 and pumps 238, 240 and 242. The liquid withdrawn from recrystallizing vessel 230 through filter 243 similarly is partially recirculated and partially passed to a third stage including recrystallizing vessel 244, heat exchangers 246 and 248 and pumps 250 and 252. The final concentrated product is removed from the recrystallizing vessel via filter 254, and a part thereof is recirculated as in the other stages.

Figure 7:
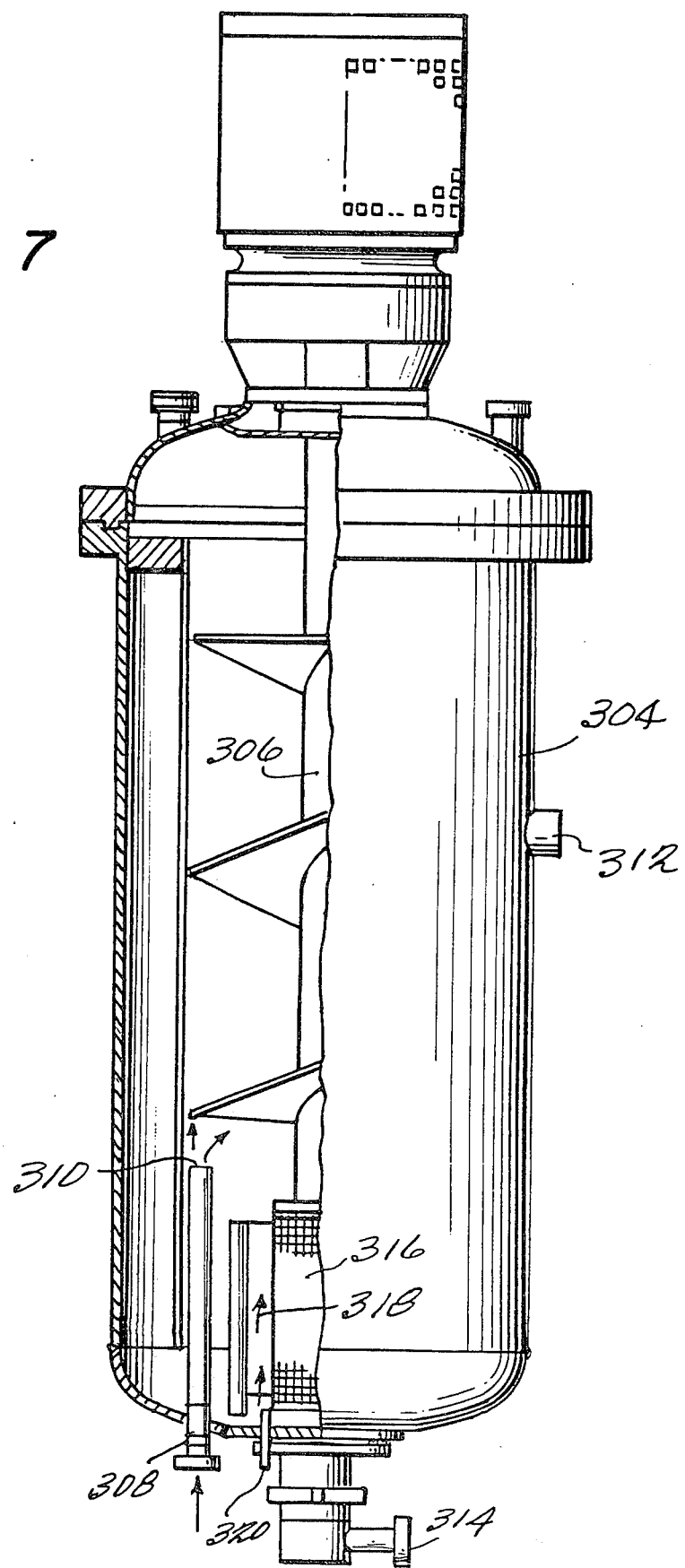
FIG. 7 shows a sectional view of a first separator according to the second embodiment.
Figure 8:
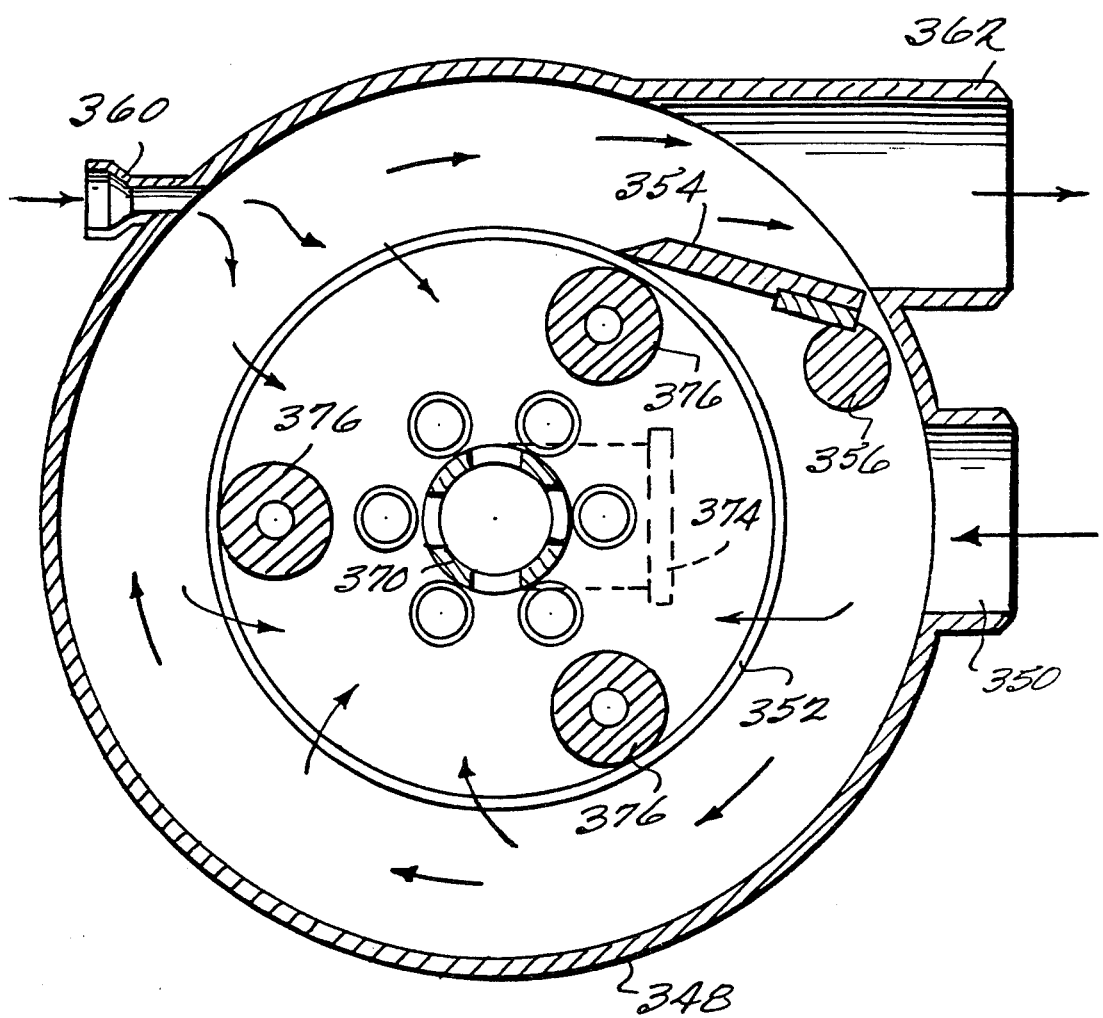
FIG. 8 shows a sectional view of a second separator according to the second embodiment.

The embodiment of FIG. 6 includes a pair of separators 260 and 262 which function as in the above-described embodiment to replace a part of the liquid from the ice slurry with the liquid from the stage to which it is to be supplied and pass the ice to the preceding stage in counter-current fashion. FIG. 7 shows the embodiment of a separator which will carry out these functions. FIG. 8 shows a preferred embodiment of the separator 260 and 262 to remove as much liquid from the ice slurry from the preceding stage as possible and replace with liquid from the stage to which it is to be supplied.

Referring again to FIG. 6, liquid withdrawn from recrystallizer vessel 216 is positively pumped by a positive displacement pump 322 to separator 260 and the liquid which is withdrawn through filter 316 (see also FIG. 6) positively pumped to the second stage by pump 324. Since in the systems of FIGS. 1 and 6 the vessels are always full, withdrawal of a given volume of liquid at a given rate from one vessel requires that an equal amount of replacement liquid be withdrawn from another vessel at the same rate. Thus, the amount of liquid which is returned to vessel 230 by pump 324 minus the product flow rate is identical to the amount of liquid mixed with the slurry of ice supplied to separator 260.

FIG. 7 shows a first embodiment of such a separator using a conventional recrystallizer for that purpose. In the recrystallizer vessel 304, an agitator 306 is continually rotated to move upward slurry received through inlet 308 which slurry moves over the top of draught tube 310 and is eventually removed through outlet 312. Liquid is continuously withdrawn through outlet 314 via conventional filter 316. A scraping knife 318 continually removes ice which builds up on the outside of filter 316 and that ice is blown upward by liquid from the stage to which ice is to be transported and circulated by the agitator 306. The liquid from the stage to which the ice is to be transported is supplied via inlet 320.

FIG. 8 shows a separator which can be used with the second embodiment of the present invention. In this separator, the slurry is supplied to a generally cylindrical tank 348 by inlet 350 and the liquid is withdrawn by a positive displacement pump through filter 352 which is of the type described above. Filter 352 is continually rotated by a motor and the ice which cakes on the outside of filter 352 is scraped from the exterior surface of filter 352 by a blade 254 mounted on member 356. Low concentrated liquid from the stage to which the ice is to be supplied is blown by a positive displacement pump into the unit tangentially to the axis of rotation at inlet 360 to cause the ice to be slurried and passed as a slurry from outlet 362 to the preceding stage. The low concentrate also penetrates to some extent through the filter and mixes with the higher concentrated solution so that the separator functions not only to move the ice but also to move the liquid in the opposite direction toward the next stage for further concentration to realize the counter-current fashion. The mixed low concentrate and high concentrate liquid pass through apertures in the central cylinder 370 and are removed at outlet 374.

It is not necessary that the slurry supply line be radial. A long filter can be used and the slurry supply line made tangential with an inside pipe having a long opening. The discharge line and the injection inlet is also preferably tangential, but can be made axially mounted if desired.

It is also possible that an open connection can simply be provided between the recrystallizer vessels and between the stages with a positive displacement pump taking liquid of a preceding stage to the next stage compensating the production and the counter-current flow of slurry. No intermediate tanks are needed with this arrangement, but this approach is inefficient in that too much concentrated liquid moves with the ice to the previous stage, and as a consequence, the concentration difference between each stage is less than desired. The use of any open tanks in a system which concentrates liquid such as coffee and the like is undesirable since the open vessels lead to the loss of dissolved gases and aroma components.

The following Example 1 sets forth the parameters for operation of the first embodiment of the invention; and the following Example 2, for operation of the second embodiment.

EXAMPLE 1

| No. | Amount of liquid (kg/h) | Concentration (wt %) | Amount of ice (kg/h) |
|---|---|---|---|
| 1 | 8,475 | 29.3 | — |
| 2 | 2,949 | 29.3 | — |
| 3 | 4,974 | 22.4 | — |
| 4 | 9,715 | 28.1 | 785 |
| 5 | 3,000 | 29.3 | 1,500 |
| 6 | 3,000 | 29.3 | — |
| 7 | 1,500 | 0.0 | — |
| 8 | 1,650 | 38.1 | 825 |
| 9 | 5,725 | 38.1 | — |
| 10 | 1,674 | 38.1 | — |
| 11 | 6,465 | 37.2 | 535 |
| 12 | 800 | 50.0 | 400 |
| 13 | 5,800 | 50.0 | — |
| 14 | 6,445 | 51.2 | 555 |
| F = feedrate | 1,974 | 12 | — |
| P = product-rate | 474 | 50 | — |
| W = water removal rate | 1,500 | 0 | — |

| Plant consists of: | three washcolumns + first stage, second stage, third stage |
|---|---|
| Volume recrystallizer vessels: | 2,850 liters. |

| Recrystallizer | Temperature | Deff (micron) |
|---|---|---|
| First stage | −4.1° C. | 219 |
| Second stage | −6.0° C. | 180 |
| Third stage | −9.6° C. | 141 |

Residence time S.S.H.E.: 0.2 min.
Deff.: 5 microns

EXAMPLE 2

| No. | Amount of liquid (kg/h) | Concentration (wt %) | Amount of ice (kg/h) |
|---|---|---|---|
| 1 | 11,210 | 23.1 | — |
| 2 | 4,173 | 23.1 | — |
| 3 | 6,963 | 18.7 | — |
| 4 | 12,940 | 22.6 | 1,060 |
| 5 | 4,200 | 23.1 | 2,100 |
| 6 | 4,200 | 23.1 | — |
| 7 | 2,340 | 27.1 | 1,170 |
| 8 | 2,340 | 34.2 | 1,170 |
| 9 | 4,173 | 27.1 | — |
| 10 | 8,265 | 34.2 | — |
| 11 | 1,938 | 34.2 | — |

-continued

| | | | |
|---|---|---|---|
| 12 | 9,640 | 34.2 | 860 |
| 13 | 850 | 39.0 | 425 |
| 14 | 850 | 50.0 | 425 |
| 15 | 1,938 | 39.0 | — |
| 16 | 5,725 | 50.0 | — |
| 17 | 6,445 | 51.0 | 555 |
| F = feedrate | 2,763 | 12.0 | — |
| P = product-rate | 663 | 50.0 | — |
| W = water removal rate | 2,100 | 0.0 | — |

| Plant consists of: | four washcolumns + first stage, second stage, third stage. |
|---|---|
| Volume recrystallizer vessels: | 2,850 liters. |

| Recrystallizer | Temperature | Deff. (microns) |
|---|---|---|
| First stage | −3.1° C. | 230 |
| Second stage | −5.0° C. | 189 |
| Third stage | −9.6° C. | 135 |

Residence time S.S.H.E.: 0.2 min.
Deff.: 5 microns

Many changes and modifications in the above embodiments can, of course, be carried out without departing from the scope of the invention. That scope is intended, therefore, to be limited only by the scope of the appended claims.

What is claimed is:

1. Apparatus for separating solids and liquid in a slurry comprising:

a vessel having a first inlet, a first outlet for solids which are separated and a second outlet for liquid which is separated;

a filter in said vessel;

means for moving said slurry toward said filter so that said liquid passes therethrough to said second outlet and said solids accumulate on said filter;

means for continuously removing said solids from said filter for transporting the removed solids to said first outlet;

means for minimizing equipment expense and maximizing volume of operation including means for supplying liquid to said first inlet so that said liquid thus supplied slurries solids removed from said filter which are then transported to said first outlet.

* * * * *